United States Patent [19]

Dambrine

[11] Patent Number: 5,941,688
[45] Date of Patent: Aug. 24, 1999

[54] FIBRE-REINFORCED ROTOR STAGE FOR A TURBOMACHINE

[75] Inventor: Bruno Jacques Gérard Dambrine, Le Mee Sur Seine, France

[73] Assignee: Societe Nationale D'Etude Et De Construction De Moteurs D'Aviation "Snecma", Paris, France

[21] Appl. No.: 08/964,632

[22] Filed: Nov. 5, 1997

[30] Foreign Application Priority Data

Nov. 7, 1996 [FR] France .................................. 96.13570

[51] Int. Cl.⁶ ........................................................ F01D 5/06
[52] U.S. Cl. ................. 416/194; 416/213 R; 416/229 A; 416/230; 416/244 A; 29/889; 29/889.3; 29/889.7; 228/193
[58] Field of Search ............................. 416/213 R, 213 A, 416/194, 229 R, 229 A, 230, 241 A, 244 R, 244 A; 29/889, 889.3, 889.7; 228/189, 193

[56] References Cited

U.S. PATENT DOCUMENTS

| | | |
|---|---|---|
| 3,515,501 | 6/1970 | Palfreyman et al. .................... 416/230 |
| 3,532,439 | 10/1970 | Palfreyman et al. .................... 416/230 |
| 3,813,185 | 5/1974 | Bouiller et al. .......................... 416/230 |
| 3,966,523 | 6/1976 | Jakobsen et al. .................... 416/241 A |
| 3,970,412 | 7/1976 | Sundt .................................. 416/213 R |
| 4,397,609 | 8/1983 | Kochendorfer . |
| 4,561,306 | 12/1985 | Marino et al. . |
| 4,867,644 | 9/1989 | Wright et al. ........................... 416/230 |
| 5,400,505 | 3/1995 | Wei et al. . |
| 5,544,805 | 8/1996 | Alassoeur et al. . |

FOREIGN PATENT DOCUMENTS

| | | |
|---|---|---|
| 0 321 382 | 6/1989 | European Pat. Off. . |
| 0 747 573 | 12/1996 | European Pat. Off. . |
| 2095458 | 11/1972 | France . |
| 262312 | 5/1970 | U.S.S.R. ............................. 416/213 R |

*Primary Examiner*—Christopher Verdier
*Attorney, Agent, or Firm*—Oblon, Spivak, McClelland, Maier & Neustadt, P.C.

[57] ABSTRACT

A turbomachine rotor stage having a thin annular body comprising a metal alloy part reinforced by at least one fibrous ring which has a radial height h of at least 1.5 times its axial width l and which is embedded in the metal alloy part so that it projects radially outwardly from the inner wall thereof in order to stiffen the body and reduce the quantity of fibre material to be used.

3 Claims, 2 Drawing Sheets

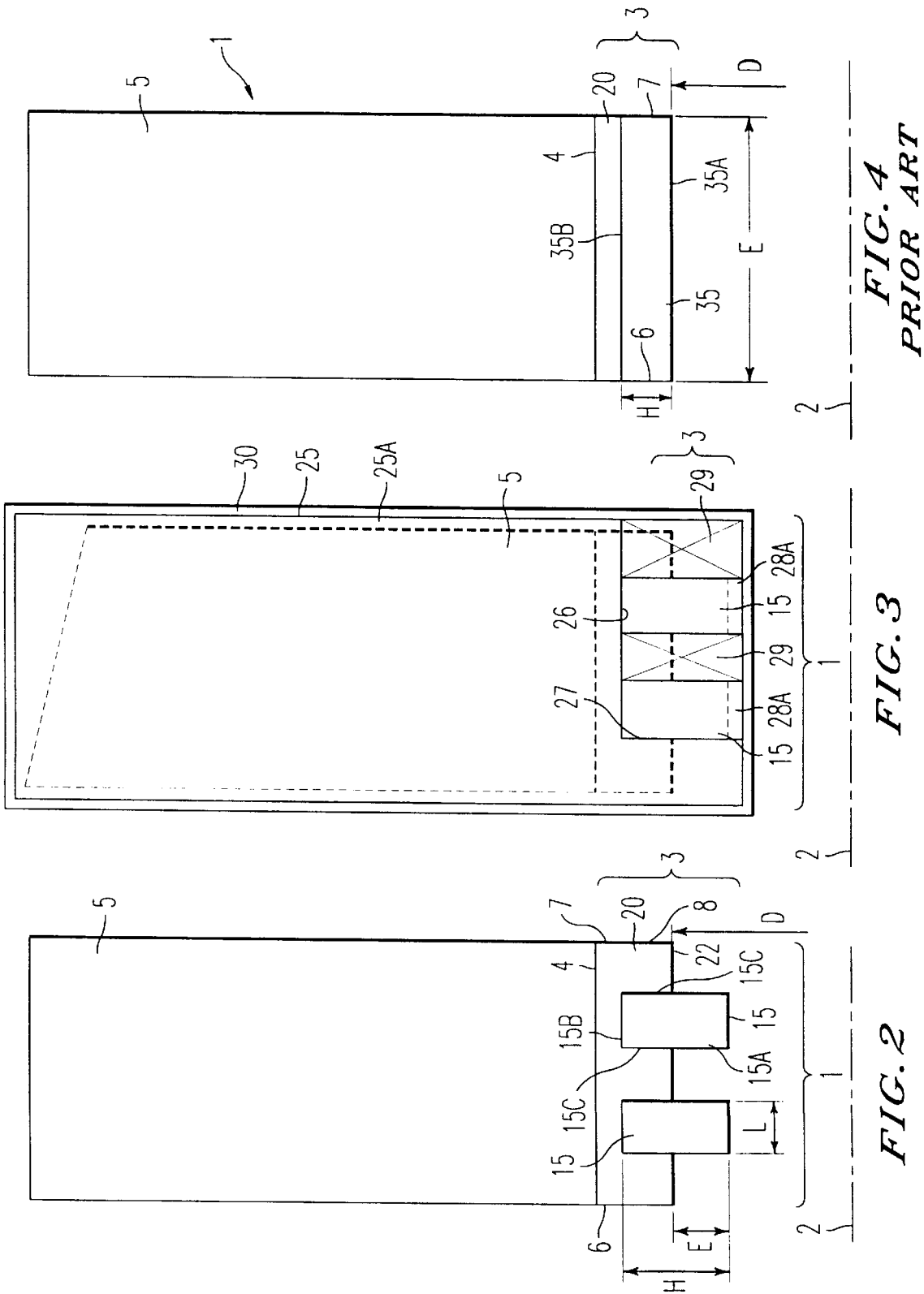

FIBRE-REINFORCED ROTOR STAGE FOR A TURBOMACHINE

BACKGROUND OF THE INVENTION

1. Field of the Invention

The invention relates to a turbomachine rotor stage of the type comprising a thin annular body including reinforcing rings, and particularly, but not exclusively, relates to a rotor stage of this type wherein the body and the blades carried thereby are formed as a single integral unit.

2. Summary of the Prior Art

In order to lighten the compressor rotors of aircraft jet engines and to increase their speed of rotation, rotors now take the form of a thin annular body reinforced by fibrous rings and supporting the blades on its outer periphery. This construction has made it possible to achieve very high speeds of rotation, but has two main disadvantages.

Firstly, rotors of this type have considerable radial flexibility due to the thinness of the annular body, which gives rise to vibrations, mainly in radial directions. These vibrations may occur in modes $1d$, $2d$, $3d$ and so on—i.e. with two diametrically opposite resonance antinodes in mode $1d$, four resonance antinodes spaced 90° apart from one another in mode $2d$, six resonance antinodes spaced 60° apart from one another in mode $3d$, and so on. These vibrations can become very severe. They cause premature fatigue of the rotor material and thus reduce the working life of the rotor. The vibrations are also transmitted to the rest of the engine by way of the bearings, with the result that the bearings and the engine structure have to be reinforced, leading to increased engine cost and weight.

This phenomenon is aggravated by the presence of the blades on the periphery of the body, since the blades form an additional mass of material which does not contribute to rotor rigidity, causing the resonant frequencies of the rotor to be reduced and the amplitude of the vibrations to be correspondingly increased.

Secondly, the fibrous reinforcing rings are very expensive for two reasons. One is the high cost of the fibres used, which are generally of silicon carbide, SiC. The other is the actual construction of the fibrous rings, in which the fibres, whose diameter is of the order of 100 $\mu$m, are spaced apart very evenly in a metal matrix, usually of TA6V titanium alloy. There are two categories of fibrous reinforcing rings which may be used.

In a first category the reinforcing rings consist of wound fibres which are spaced apart from the metal of the matrix before the assembly is compacted by hot pressing or forging along the geometric axis of the spirals. The reinforcing rings are then welded to the rotor, or disposed in the rotor before subjecting it to a high-temperature pressing cycle serving to shape the rotor and weld the rings to the rotor material.

Fibrous rings of this type usually have a rectangular cross-section in which adjacent sides have very similar lengths. The tensile strength in respect of circumferential stresses is very high since they are effectively in the direction of the fibres, but the tensile strength in respect of radial stresses is less since the stresses act perpendicularly to the fibres. Since the rings are of reduced width in the axial direction, their resistance to a radial force tending to separate the fibre layers is unsatisfactory. Such rings are therefore usually disposed around the material of the rotor (i.e., at the rotor periphery), on the sides of the rotor, or inside the rotor near the centre of gravity of the rotor cross-section.

In the second category the reinforcing rings consist of a superposed stack of strips of matrix metal which are rolled into a cylindrical shape and parallel reinforcing fibres which cover each of the cylinders and are disposed in the circumferential direction of the cylinders. The stack of strips and fibres is disposed against the inner wall of a rotor blank and the assembly is treated by centrifugal radial forging to compact the strips and fibres and weld the resulting fibrous mass to the inner wall of the rotor. This arrangement is considered to be more rational to the extent that it helps to concentrate the reinforcing fibres against the inner wall of the rotor, which is the zone most stressed by the centrifugal force caused by rotation. It also makes it possible to have a reinforcing ring with a very long rectangular cross-section extending over the entire width of the rotor. The disadvantage of this arrangement, however, is that the fibres must be cut to the length of the circumference which they occupy before centrifugal forging if they are not to break during the radial centrifugal forging. Although these cuts are distributed uniformly so as not to overlap, they nevertheless produce non-uniformities which weaken the rotor.

SUMMARY OF THE INVENTION

It is an object of the invention to provide a rotor stage of the type having a thin fibre-reinforced annular body with improved radial rigidity while utilizing a smaller volume of reinforcing fibre and without adversely affecting other aspects of the rotor performance.

To this end, the invention provides a fibre-reinforced rotor stage for a turbomachine, comprising a thin annular body having an axis defining the geometric axis of rotation of the rotor stage, and a plurality of blades projecting radially outwardly from the outer periphery of said body, said body comprising a metal alloy part having a radially inner wall, and at least one reinforcing ring mounted in said metal alloy part and containing reinforcing fibres which are disposed in a circumferential direction centred on said axis of rotation, said at least one reinforcing ring having a height h in a radial direction which is at least 1.5 times the width l of the ring in an axial direction and projecting radially inwardly from said inner wall of said metal alloy part by a distance e which is at least one-third of the said height h, said at least one reinforcing ring being welded to said metal alloy part at the outer periphery of said ring and on both sides thereof within said metal alloy part.

Preferably, the radial height h is at least 1.8 times the axial width l, and the ring projects inwardly by a distance e which is half the height h.

It will be apparent that increasing the ratio h/l increases the radial rigidity of the ring and therefore of the rotor. The increased ratio h/l also helps to reduce the diameter of the reinforcing ring and to arrange it so that it projects beyond the inner wall of the rotor, with the following advantages:

1) The quadratic moment of the rotor, and therefore its rigidity, is increased.
2) Rigidity is further improved because the reinforcing ring is remote from the geometric centre of gravity of the rotor cross-section, and the modulus of elasticity, or Young's modulus, of the SiC fibre reinforcing material is high, being approximately 220000 MPa as compared with the remainder of the rotor material which, in the case of TA6V alloy, is 120000 MPa.
3) The reinforcing fibres are located in the most stressed zone of the rotor—i.e., near its inner wall.
4) The diameter of the reinforcing ring is reduced, thus leading to a reduction, for a given cross-section, in the amount of SiC fibre used and, therefore, in the cost of the rotor.

Further advantages and features of the invention will become apparent from the following description of a preferred embodiment and a comparison of its performance with that of a conventional rotor of the same dimensions.

BRIEF DESCRIPTION OF THE DRAWINGS

FIG. 2 shows diagrammatically a view of the rotor stage shown in FIG. 1;

FIG. 3 shows a view similar to FIG. 2 but illustrating a process for manufacturing the rotor stage; and, FIG. 4 shows a view corresponding to FIG. 2 but illustrating a conventional rotor stage of the same dimensions as the rotor stage in accordance with the invention.

DESCRIPTION OF THE PREFERRED EMBODIMENTS

Figure 1:
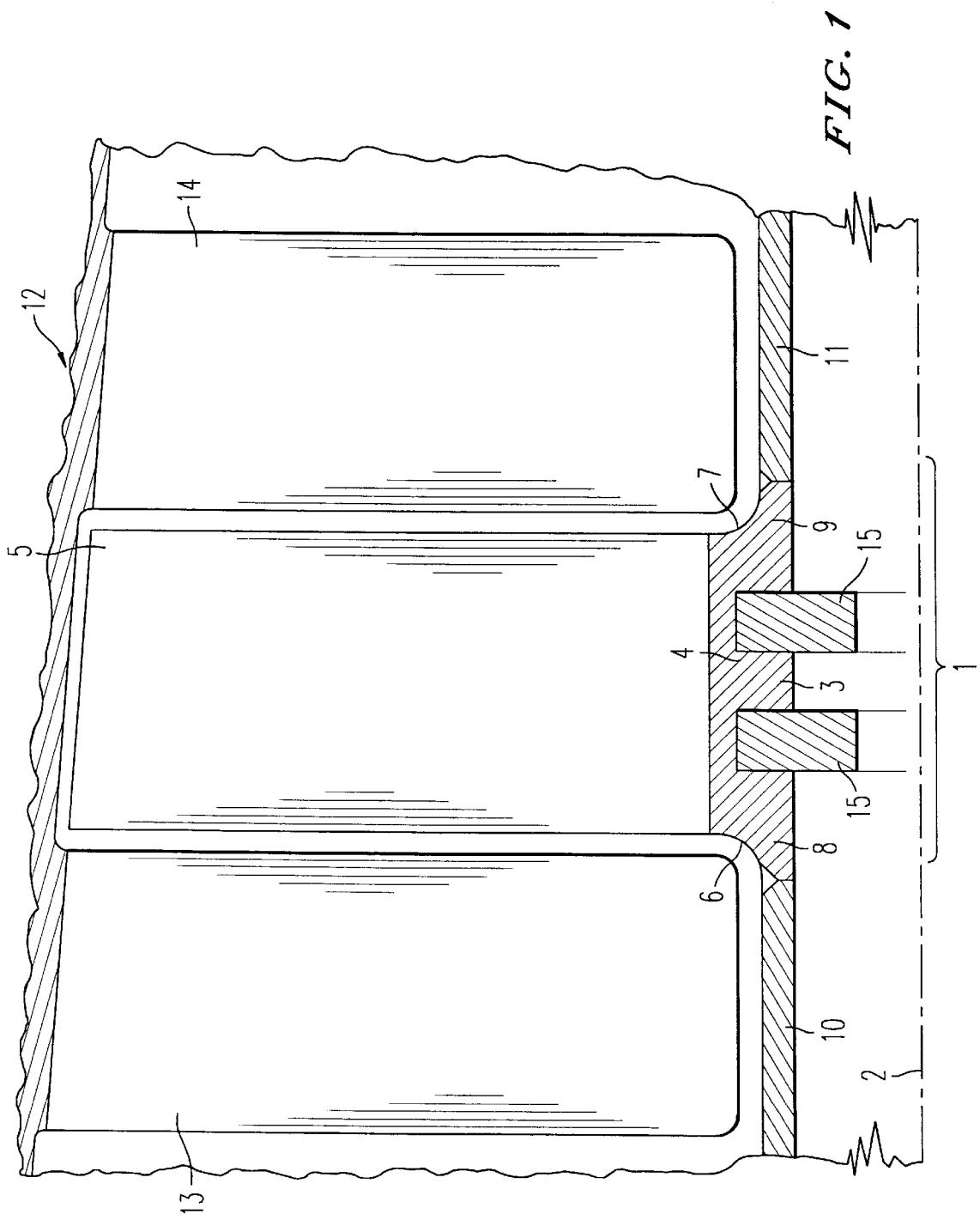
FIG. 1 shows a sectional view through part of a bladed rotor having a rotor stage in accordance with a preferred embodiment of the invention, the internal radius of the rotor having been contracted in order to reduce the size of the drawing.

Referring first to FIG. 1, a rotor stage 1 is shown which is generally symmetrical about its geometric axis 2 of rotation and which comprises an annular body 3 carrying on its outer periphery 4 a plurality of radially outwardly extending blades 5. The body 3 has flanges 8, 9 on its sides 6 and 7 respectively for rigidly securing the stage 1 to the adjacent stages 10, 11 by bolting, electron beam welding or any other suitable means. The assembly rotates around the axis 2 inside a casing 12 carrying two stages of fixed straightener vanes 13, 14 disposed on opposite sides of the rotating blades 5.

The body 3 is reinforced by fibre rings 15 in a manner in accordance with the invention.

Referring now to FIG. 2, the body 3 comprises a first part 20 of generally rectangular cross-section made of TA6V titanium alloy, and two reinforcing rings 15 which are embedded partly within the first part 20 and are made of silicon carbide fibres in a TA6V titanium alloy matrix. The reference 22 indicates the radially inner wall of the metal first part 20 of the body 3, inner wall 22 and the outer periphery 4 of the part 20 being cylindrical.

The reinforcing rings 15 are centred on the axis 2 and each has a rectangular cross-section with a height h in the radial direction and a width 1 in the axial direction. A portion 15a of each ring 15 projects by a distance e radially inwardly beyond the inner wall 22 towards the axis 2. The term "projects" means that the inner wall 22 extends on each side of the ring 15 and that the inner periphery of the ring 15 is nearer the axis 2 than the wall 22 adjacent the ring 15. The reference d denotes the diameter of the inner wall 22. A sufficient, but not critical, thickness of material is left between the outer periphery 15b of each ring 15 and the outer periphery 4 of the part 20. Each ring 15 is welded to the metal part 20 over its outer periphery 15b and both of its flanks 15c which are embedded in the part 20 to a depth equal to (h-e). This ensures that the forces exerted by the metal part 20 of the body 3 on the rings 15 are distributed over the largest possible area, thus reducing the stresses exerted on the material of the metal part 20 near the surfaces 15b and 15c.

Referring now to FIG. 3, the assembly consisting of the body 3, the rings 15 and the blades 5 is shown in chain lines, and is preferably constructed in the following manner.

a) An annular blank 25 made of TA6V titanium alloy is produced having an overthickness 25a relative to the assembly, and a bore 26 which opens laterally on one side of the blank and radially towards the axis 2 and which is bounded laterally on the other side of the blank by a radially inwardly projecting shoulder 27.

b) Two fibrous reinforcing rings 15 are produced by a known process as hereinbefore described, each ring having an inwardly extending overthickness 28a substantially equal to the overthickness 25a.

c) Two spacers 29 are made of a metal which is the same as that of the blank 25.

d) A first of the rings 15 is introduced axially into the bore 26 against the shoulder 27, followed consecutively by a spacer 29, the second ring 15 and the second spacer 29 in order to completely fill the bore 26 as far as its end remote from the shoulder 27.

e) The resulting assembly consisting of the blank 25, the rings 15 and the spacers 29 is placed in a vacuum container 30 in the form of a deformable hermetic metallic envelope extending around the assembly and sealed after being evacuated.

f) The enclosed assembly is subjected to isostatic compression in an autoclave at the isothermal forging temperature of the metal alloy of the blank 25. This step welds the assembly together by diffusion of material between the blank 25, the rings 15 and the spacers 29.

g) The welded assembly is machined to the final shape of the blades 5 and the body 3 reinforced by the rings 15.

In the embodiment described, the rings 15 are made of silicon carbide fibres embedded in a TA6V titanium alloy matrix. The remainder of the rotor stage is made of TA6V titanium alloy. The rings 15 have an h/l ratio of 2, and project radially inwardly from the inner wall 22 by a distance e such that e/h=0.5. The rings 15 have a width l=3.25 mm and a height h=6.5 mm. The metal part 20 of the body 3 has a rectangular cross-section wherein the axial distance between its opposite sides 6 and 7 is 16 mm, the radial distance between the walls 22 and 4 is 4.5 mm, and the internal diameter d of the wall 22 is 93 mm.

At 400° C. the TA6V alloy can withstand a maximum stress $\sigma 1$ of $60 \times 10^7$ Pa, whereas the reinforcing rings consisting of SiC fibres embedded in a TA6V matrix can withstand a maximum tangential stress $\sigma 2$ in the direction of the fibres of $95 \times 10^7$ Pa and a maximum radial stress $\sigma 3$ transversely of the fibres of only $20 \times 10^7$ Pa.

In the rotor stage in accordance with the invention the maximum stress $\sigma 2 = 95 \times 10^7$ is reached in those parts 15a of the rings 15 which project inwardly from the wall 22, whereas a maximum stress $\sigma 1 = 48 \times 10^7$ Pa is reached at the periphery 15b of the rings 15 and at the sides 15c thereof within the metal part 20 of the body 3 at a rotational speed $\theta = 28350$ rpm. In the metal part 20 of the body 3 the stress $\sigma 1$ decreases very rapidly with increasing distance from the walls 15b and 15c. In the reinforcing rings 15 the radial stress is greatest at the periphery 15b and reaches a value $\sigma 3 = 7.8 \times 10^7$ Pa which, contrary to what might be feared with the projecting arrangement of the reinforcing rings, is still below the tolerable limit. The other stresses stay below the tolerable limits mentioned.

Referring now to the reference rotor stage which is illustrated in FIG. 4 and which is constructed in a known manner, the body 3 and the blades 5 are the same as in the embodiment of the invention described above except for the reinforcing rings 15, which are replaced by a single ring 35 of rectangular cross-section extending from one side 6 of the body 3 to the other side 7, the ring 35 defining a radially inner wall 35a and having a radial thickness or height h of 3 mm. The thickness of the material 20 between the outer periphery 4 of the body and the outer periphery 35b of the ring 35 is the same as in the previous embodiment. In such a ring a maximum stress $\sigma 2 = 95 \times 10^7$ Pa is reached towards the inner wall 35a and a maximum stress $\sigma 1 = 52 \times 10^7$ is reached in the metal part 20 of the body 3 towards the ring periphery 35b at a speed of rotation $\theta$ of 27400 rpm. The stress $\sigma 1$ decreases very rapidly with increasing closeness to the outer periphery 4 of the body.

A comparison of the performance of the rotor stage in accordance with the invention and the performance of the reference rotor stage of the same dimensions shows that the invention solves the problems addressed in that it achieves:

a) a reduction of the quantity of fibre material needed to make the rings 15 as compared with the single ring 35, amounting to −11% over the cross-section and 15% in volume;

b) an increase in the maximum speed of rotation; and, c) improved rigidity of the annular body.

This comparison also reveals another advantage of the invention. For a constant speed the invention makes it possible to reduce rotor stresses and therefore to prolong rotor life and/or reduce rotor weight.

The invention is not limited to the embodiment which has been described, but covers any variants which may be made to it without departing from the scope of the invention as hereinafter claimed.

The embodiment described is that of a test rotor stage in a simplified shape which is normally used for experimental work in standard conditions on new technology, and for making comparisons with known technologies. The provision of one or more reinforcing rings projecting inwardly beyond the inner wall of a rotor stage in accordance with the invention helps to improve the performance of rotors of various shapes, although stress distributions may vary a little according to the shape.

The rotor stage may comprise only a single reinforcing ring 15, or more than two rings. However, the two-ring construction is preferred since it provides the best compromise between body rigidity and the quantity of fibrous material used. In all cases the rotor stage is assembled by stacking premachined fibrous rings 15 and spacers 29 alternately and in equal numbers in the bore 26 against the shoulder 27, starting with a ring 15 and ending with a spacer 29.

In a variant, the shoulder 27 may be omitted and replaced by an additional spacer 29.

I claim:

1. A fibre-reinforced rotor stage for a turbomachine, comprising a thin annular body having an axis defining the geometric axis of rotation of the rotor stage, and a plurality of blades projecting radially outwardly from the outer periphery of said body, said body comprising a metal alloy part having a radially inner wall, and at least one reinforcing ring mounted in said metal alloy part and containing reinforcing fibres which are disposed in a circumferential direction centred on said axis of rotation, said at least one reinforcing ring having a height h in a radial direction which is at least 1.5 times the width l of the ring in an axial direction and projecting radially inwardly from said inner wall of said metal alloy part by a distance e which is at least one-third of the said height h, said at least one reinforcing ring being welded to said metal alloy part at the outer periphery of said ring and on both sides thereof within said metal alloy part.

2. A fibre-reinforced rotor stage according to claim 1, wherein said radial height h is at least 1.8 times said axial width l, and said distance e is half of said height h.

3. A method of making a rotor stage in accordance with claim 1, including the steps of:

a) producing a blank from which said blades and said metal alloy part of the body of said rotor stage can be machined, said blank having an internal bore;

b) placing premachined fibre reinforcing rings alternately with spacers in said bore;

c) placing the assembly obtained in step (b) in a vacuum container and subjecting said assembly to isostatic compression in an autoclave at the isothermal forging temperature of the metal alloy;

d) machining the body and the blades to shape.

* * * * *